W. W. HARWOOD.
INTERNAL COMBUSTION ENGINE.
APPLICATION FILED NOV. 16, 1914.

1,160,602.

Patented Nov. 16, 1915.
3 SHEETS—SHEET 1.

WITNESSES:

INVENTOR
William W. Harwood
BY
ATTORNEYS.

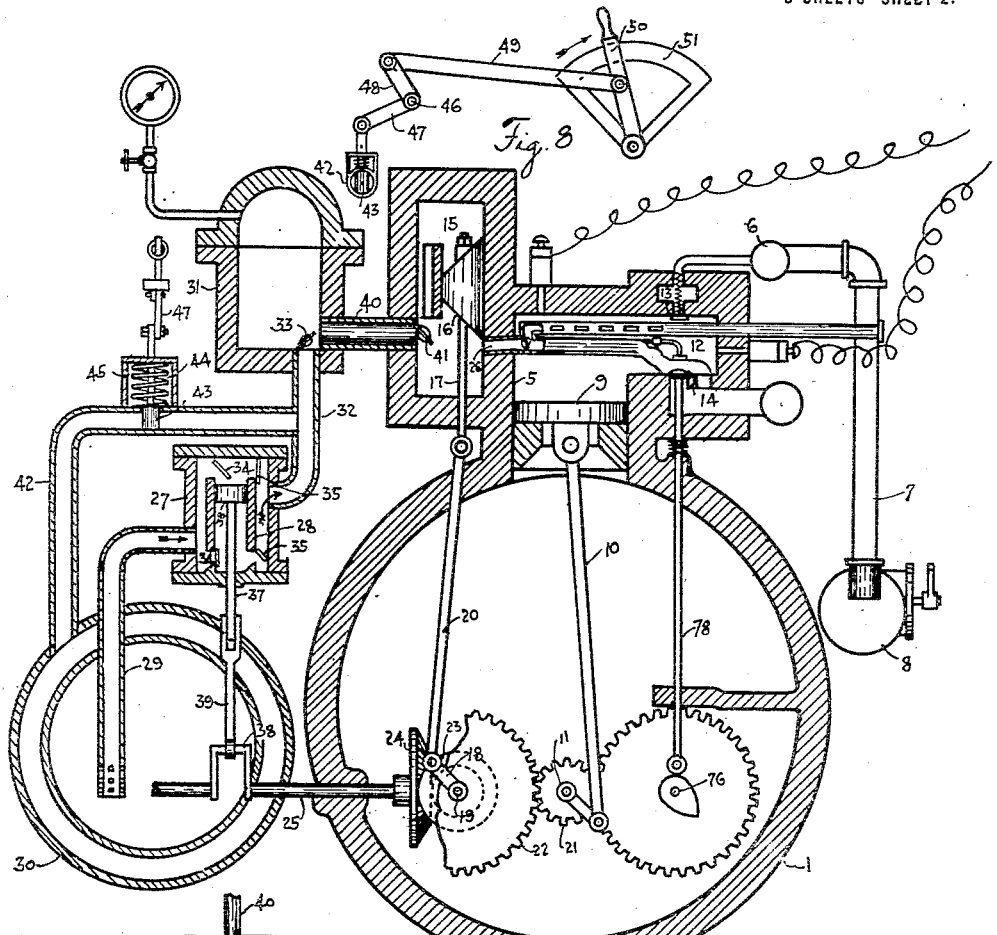
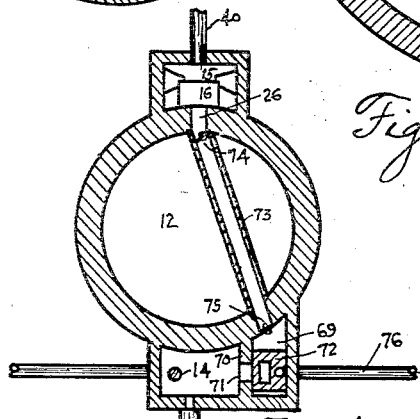
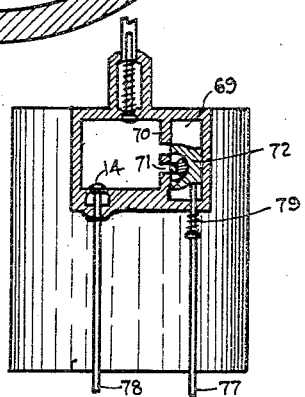

W. W. HARWOOD.
INTERNAL COMBUSTION ENGINE.
APPLICATION FILED NOV. 16, 1914.

1,160,602.

Patented Nov. 16, 1915.
3 SHEETS—SHEET 3.

WITNESSES:

INVENTOR
William W. Harwood
BY
ATTORNEYS

UNITED STATES PATENT OFFICE.

WILLIAM W. HARWOOD, OF WAELDER, TEXAS, ASSIGNOR OF ONE-FOURTH TO GEORGE HARWOOD, OF CEDAR BAYOU, TEXAS, AND ONE-FOURTH TO IRA BROWN, OF COMFORT, TEXAS.

INTERNAL-COMBUSTION ENGINE.

1,160,602.　　　　Specification of Letters Patent.　　Patented Nov. 16, 1915.

Application filed November 16, 1914. Serial No. 872,348.

*To all whom it may concern:*

Be it known that I, WILLIAM W. HARWOOD, a citizen of the United States, residing at Waelder, in the county of Gonzales and State of Texas, have invented certain new and useful Improvements in Internal-Combustion Engines, of which the following is a specification.

This invention relates to new and useful improvements in internal combustion engines.

The object of the invention is to provide a device of the character described, whereby water is converted into steam, and then delivered into the combustion chamber of an internal combustion engine and there mingled with the charge of gasolene and utilized as a motive fluid.

Another feature of the invention resides in the provision of means for supplying the water to be converted into steam, and for regulating the amount of such charge so supplied.

A further feature of the invention resides in the provision of means whereby a steam charge may be suddenly delivered into the combustion chamber, just before the motive fluid charge therein is ignited.

A still further feature of the invention resides in the provision of means whereby the exhaust from the cylinders of the engine is utilized for heating the water supplied to the cylinders, and thereby rendering it the more readily convertible into steam.

With the above and other objects in view the invention has particular relation to certain novel features of construction, operation and arrangement of parts, an example of which is given in this specification and illustrated in the accompanying drawings, wherein:—

Figure 1:
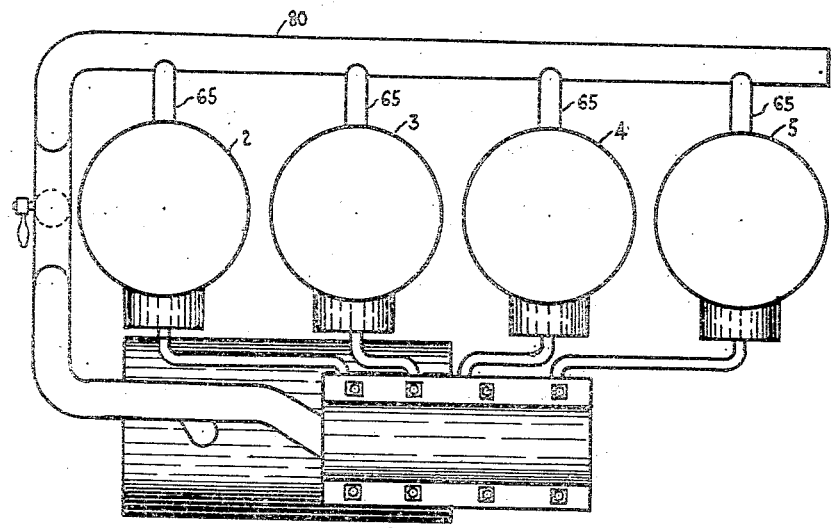
Figures 2, 3, 4:
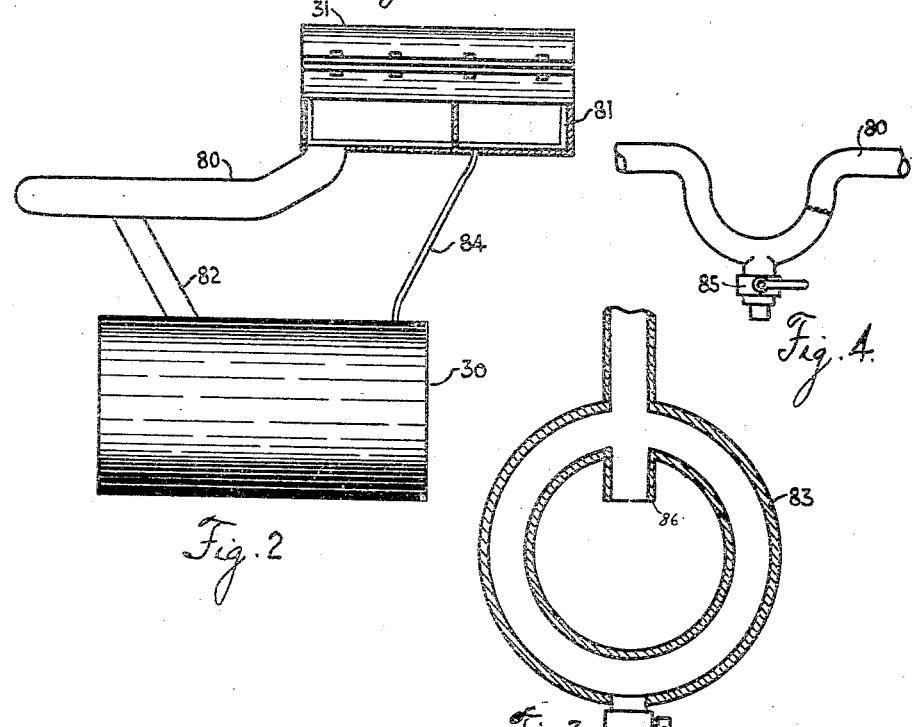
Figure 6:
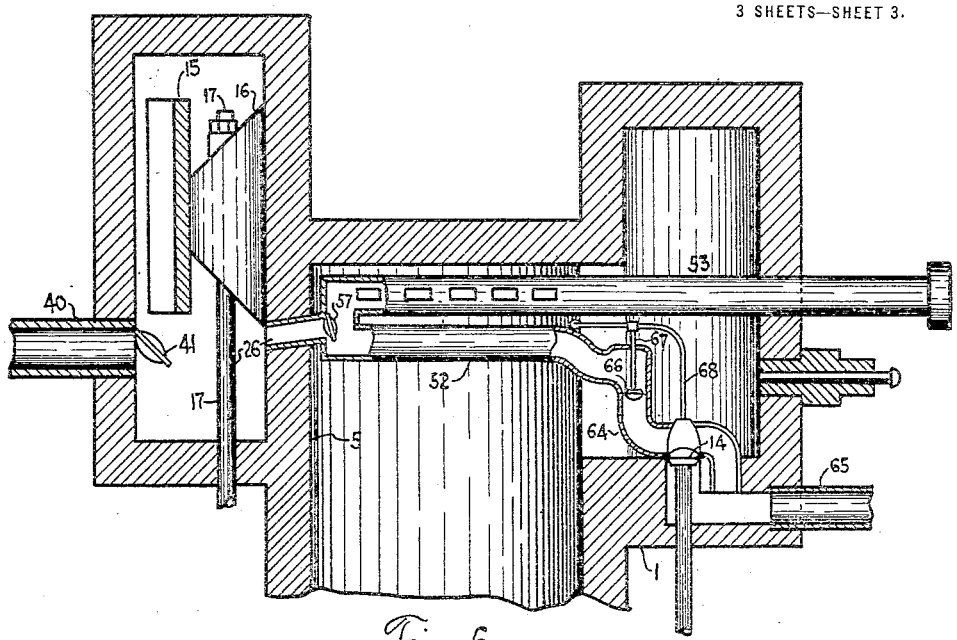
Figure 7:
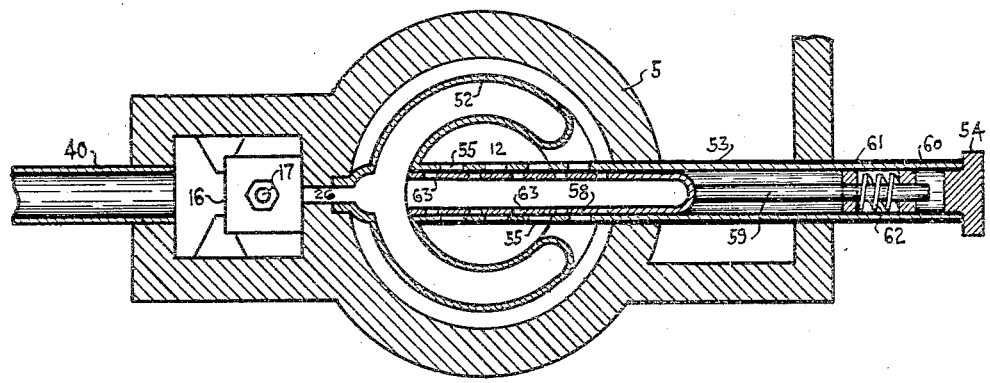

Figure 1, is a plan view of the internal combustion motor showing the water tank and distributing chamber in connection therewith. Fig. 2, shows a side elevation of said tank and chamber the latter being shown partially in section, and showing also the pipe connections. Fig. 3, shows a sectional end view of the water tank. Fig. 4, shows a section of the pipe connecting the exhaust from the cylinders with said water tank and chamber, showing the construction for draining said pipe. Fig. 5, shows a sectional view of the motor. Fig. 6, shows a fragmentary transverse sectional view of the combustion chamber of one of the cylinders, showing the steam generator therein. Fig. 7, shows a horizontal sectional view thereof. Fig. 8, is a side view of the cut-off valve employed in connection with the distributing chamber shown in Fig. 5, and, Figs. 9 and 10, show side elevation and horizontal sectional views, respectively, of a modified form of the steam generator employed.

Referring now more particularly to the drawings, wherein like numerals of reference designate similar parts in each of the figures, the numeral 1, refers to the motor casing which may be of any well-known construction, and in connection with which are the cylinders 2, 3, 4, and 5. An intake manifold 6, is provided, which communicates with the four cylinders in the well-known manner, leading to which is the intake pipe 7, which carries the carbureter 8, said carbureter being of any approved construction. Each cylinder is provided with a piston, as 9, which reciprocates therein and which is driven by a connecting rod, as 10, which, in turn, is actuated by the engine drive-shaft 11. The combustion chamber, shown in Fig. 5, is designated by the numeral 12, and has an intake valve 13, and an exhaust valve 14, of the ordinary and well-known construction. Each cylinder is provided with an hydro-slide valve chamber 15, having the slide valve 16, each of said valves being reciprocated through a valve rod, as 17. Each of said rods is operated through the corresponding crank 18, fixed on the end of shaft 19, and operatively connected with its respective rod through the link 20. The shaft 19 ordinarily runs at one-half of the speed of the engine shaft 11, the latter being operatively connected with the former through the spur-gear wheels 21 and 22, the former of which is fixed on the engine shaft and has a circumference equal to one-half of the circumference of the last mentioned gear wheel, which is fixed on said shaft 19. The spur-gear wheel 22, is partially broken away so as to show the bevel pinion 23, which is fixed on the shaft 19, and which meshes with, and operates the bevel pinion 24, which is carried by and drives the pump shaft 25. Inasmuch as the shaft 19 travels at one-half the speed of the engine drive shaft, two strokes of the slide valve 16, are performed for every four strokes of the piston 9. The slide valve 16 is adjusted to open the water port 26, during the compression stroke of the engine and to close said port 26, during the power, exhaust and suction strokes.

The slide valves are adjusted to operate in uniform succession corresponding to the firing of the charges in the cylinders. To illustrate, taking Fig. 1, of the drawing, in a four cylinder engine, the charge fires first in the cylinder 2, then in cylinder 3, next in cylinder 5, and then in cylinder 4. This order will be maintained in the construction illustrated in Fig. 5, and in such case the valve cranks 18 must be adjusted so that the valves 16 will open the water ports 26, during the compression stroke in the cylinders in the order of succession before mentioned, that is, when the water is cut off from one cylinder, it is admitted to the next succeeding cylinder, in the order mentioned, and when cut off from that cylinder it is admitted to the next, and so on.

As illustrated in Fig. 5, the engine has just commenced the compression stroke and the water port has just begun to open, both the piston and slide valve are ascending and when the crank 18 has reached the limit of its thrust, the water port 26, is entirely open and the piston 9 is at the middle of its second stroke. At this point the slide valve 16 begins its forward movement and when it has traveled one-fourth of the down stroke and the port 26 is closed by it, the piston 9, has reached the end of the compression stroke, and at this point the charge in the cylinder is ignited. By the time the piston has reached the end of the power stroke, the slide valve 16, has performed three-fourths of its back or down stroke, and the piston 9, begins its exhaust stroke, and when the middle of said stroke has been reached, the valve 16 has completed its back stroke and begun another forward stroke, and by the time said forward stroke is one-fourth completed, the piston 9, has completed its exhaust stroke and is ready to begin its suction stroke. When the valve 16 has performed one-half of its forward stroke, the piston has reached the middle of its suction stroke, and by the time the slide valve 16, has performed three-fourths of its forward stroke the piston has reached the end of the suction stroke, and is ready to begin the compression stroke. At this point, the water port 26, begins to open and admit the water charge, and by the time said valve has reached the limit of its forward stroke, said port is open to its fullest extent, and the piston has reached the middle of the compression stroke. At this point the valve 16, begins another back stroke, and when it has performed one-fourth of said stroke, the piston has completed the compression stroke and the water port 26, is closed, and an explosion in the cylinder occurs. The same operation is performed in each cylinder in uniform succession, as hereinbefore explained.

The numeral 27, refers to a pump casing which is cylindrical in form and which has a stationary liner 28, fixed therein. Water is admitted into the casing through the pipe 29, which leads from said casing and whose free end extends down into the water tank 30, arranged adjacent to the motor. A distributing chamber 31 is provided which communicates with the pump casing through the water pipe 32, whose upper end is controlled by the gate valve 33. The water is admitted into the liner through the valves 34, 34, which open to the right and one of which is located at each end of said liner and is discharged therefrom through the valves 35, 35, which also open to the right and one of which is located at each end of the liner. A piston 36, reciprocates in the liner 28, and is driven by the piston rod 37, which in turn, is operatively connected with the wrist 38 of the shaft 25, through the connecting rod 39. As shown in the drawings, the piston 36, has begun the down stroke and the flow of the water is shown by the arrows. The pump operates at one-eighth the speed of the engine, and in the preferred form of engine the pump has a sufficient capacity to give a charge of one cubic inch of water for each power stroke of the engine. During the down stroke of the piston 36, as shown in Fig. 5, the upper inlet valve 34, and the lower discharge valve 35, will be open, and the other two closed, and during the upper stroke of said piston, the reverse is true. The lower inlet valve 34, and the upper discharge valve 35, being open and the other two closed, alternatively, gives an even and constant flow of water, the water being discharged with each stroke of the piston, and the pump being, in effect, a double acting pump. The water is thus forced through the pipe 32, into the distributing chamber 31, and thence through the pipe 40 into the chamber 15. Back flow of water through the pipe 40 is prevented by the gate valve 41.

The distributing chamber 31, is also an air chamber, the air in the upper part thereof receiving the pressure of the water and being compressed thereby, and the capacity of the chamber 31 in effect, is thus variable, so that if either of the valves 16, should not open in time, that is if the valve controlling the flow of fluid through one of the ports 26, should not open just as the valve controlling one of the other of said ports closes, as heretofore explained, the over supply of water to the distributing chamber 31 can be accommodated, until said valve opens, by the further compression of the air in said distributing chamber.

It is sometimes desirous to cut off the supply of water to the distributing chamber 31, as for example when the engine is first started and the cylinders are cold. This may be done by diverting the water from said chamber and returning the same to the water tank 30. The mechanism for diverting the water is shown in Figs. 5 and 8, and will now be described. Leading from the pipe 32 is a relief pipe 42, which leads back into the water tank 30. This pipe is normally closed by means of the plug 43. This plug is normally held in position to block the water passage way through the pipe 42 by means of the coil spring 44, which is inclosed in the box 45, carried by the pipe 42, and which is attached to, and presses against said plug. A bell crank is provided and pivoted at the point 46. One arm 47 of this crank is pivoted to the upper end of the plug 43 and the free end of the other arm 48 thereof, is pivoted to one end of the link 49, whose other end is pivoted to the manual lever 50. The lever 50 may be fixed in any desired position by engagement with the rack 51. When the lever 50 is pulled back in the direction indicated by the arrow in Fig. 8, the plug 43 will be raised through the mechanism just described and the pipe 42 opened. The water from the pipe will thus be sent back to the water tank 30. The fluid, however, will be retained in the distributing chamber 31, in as much as the upper end of the pipe 32 is controlled by the valve 33, which is closed by the back pressure of the fluid in chamber 31.

It will be noted that the valve chamber 15 will usually be filled with water more or less under compression and in order to minimize the friction of the valve 16 therewith, as it reciprocates the back of said valve is tapered or beveled each way, as shown, so as to present a more or less thin edge at each end of the valve, to facilitate its movement back and forth.

In each cylinder there is a steam generator 52, formed of a tube bent in a circular shape, and which is supported by the inner end of the tubular member 53, which projects into the combustion chamber and whose interior communicates with the interior of the steam generator. The outer end of this member 53, is closed by a cap 54, and the inner end thereof has two oppositely disposed rows of perforations 55. The port 26 leads into said generator, the same being controlled by the gate valve 57 which prevents the back flow of fluid through said port. Within the tubular member 53 is a slidable tubular valve 58 whose open end faces toward the inlet port 26, and whose opposite end is closed, and from the closed end of which extends the valve stem 59. This stem is located axially with respect to the member 53, and extends through the llar 60, which is fixed in said member, and interposed between said collar and the collar 61 fixed on said stem, and surrounding the stem, is a coil spring 62. The valve 58 has two oppositely disposed rows of orifices 63, in horizontal alinement with the orifices 55 and disposed a corresponding distance apart. The pressure of the spring 62 normally holds the valve 58 in such position that the orifices 55 will have a staggered relation to the orifices 63. When a charge of water is admitted into the steam generator 52, the heat from the explosion in the combustion chamber, immediately converts said charge into steam, the expansion of which forces back the valve 58, overcoming the resistance of the spring 62, until the orifices 63, and the orifices 55 are brought into alinement, and the steam escapes therethrough into the combustion chamber.

A drain pipe 64 leads from the steam generator into the exhaust pipe 65. This pipe is controlled by the lift valve 66, whose stem 67 is attached to the lift lever, 68. One end of this lever is pivoted to the drain pipe 64 and the other end is alined above the exhaust valve 14, so that when the exhaust valve lifts to permit the exhaust of the spent gases, it will also operate to lift the valve 66 and permit the escape of unconverted water from the steam generator. This arrangement is particularly necessary in as much as often no explosion occurs in a cylinder and in such cases the water in the generator would not be converted into steam, and should be drawn off to prevent too large a charge when the next explosion occurs.

In Figs. 9 and 10, I have shown a modified form of the steam generator together with the modified construction for admitting the steam into the combustion chamber. In this form on one side of each cylinder I have provided a steam chamber 69, separated from the combustion chamber 12 by means of the partition 70. This partition has a plurality of orifices 71 which are controlled by the slide valve 72. The water charge is delivered into the steam generator 73, which is tubular in form and leads from the inlet port 26 and discharges in the steam chamber 69, and whose respective ends are controlled by the gate valves 74 and 75 respectively, which prevent the back flow of fluid through said generator. This generator spans the combustion chamber and receives the heat from the combustion therein, and the water is converted into steam and is delivered into the steam chamber 69. When the explosion occurs and the water in the generator is converted into steam by the heat therefrom the steam pressure operates to close the valve 74 and to open the valve 75, and the steam charge is delivered to the chamber 69 and there retained in readiness to be delivered into the combustion chamber at the next succeeding explosion. The inlet slide valve 72, as well as the exhaust valve 14 is actuated from the cam-shaft 76 through the respective valve stems 77, 78, the valve 72 opening to admit the charge of steam into the combustion chamber just as the explosion occurs and the valve 14 opening to permit exhaust after such explosion. A coil spring 79 surrounds the stem 77 and operates thereagainst to close the valve 72 at the end of the power stroke, and until it is again opened by the operation of the cam-shaft 76.

Each of the exhaust pipes 65 discharge in the conduit 80 which leads around the front end of the motor and discharges into the jacket 81, of the distributing chamber 31. This conduit divides, however, and one branch thereof terminates in the jacket 83, surrounding the water tank 30. The exhaust gases, after passing through the jacket 81 descend through the pipe 84 into the jacket 83 and said gases serve to heat the water in the tank and distributing chamber before they are condensed and re-delivered into the water tank 30, through the inlet 86. The valve chambers 15 may also be provided with surrounding jackets if desired, through which the exhaust gases may be passed for the purpose of heating the water contained therein. The conduit 80, is provided with a drain cock 85 through which all residuum may be drained off from the conduit 80.

What I claim is:—

1. A device of the character described, including the combination with an internal combustion engine having a cylinder, of a fluid container, a fluid conduit leading from said container, a steam generator in the cylinder and so positioned as to receive heat from the combustion therein and with which said conduit communicates, means for forcing fluid through said conduit into said generator, and a valve operated by fluid pressure in the generator and controlling the passage of fluid therefrom.

2. A device of the character described, including the combination with an internal combustion engine having a cylinder, of a steam generator in said cylinder and a steam generator arranged entirely within the cylinder, a fluid container, a fluid conduit leading from said container and communicating with said generator, a means for forcing fluid through said conduit, a mechanism controlling the discharge of fluid from said conduit into said steam generator, and a valve operated by fluid pressure in the generator and controlling the passage of fluid therefrom.

3. A device of the character described, including the combination with an internal combustion engine having a cylinder and a steam generator arranged entirely within the cylinder of a fluid container, a fluid conduit leading from said container and communicating with said generator, means for forcing fluid through said conduit into said generator and means for intermittently blocking said conduit, and a valve operated by fluid pressure in the generator and controlling the passage of fluid therefrom.

4. A device of the character described, including the combination with an internal combustion engine having a cylinder of a fluid container, a fluid conduit leading from said container, a steam generator arranged entirely within the cylinder with which said conduit communicates, a valve for intermittently blocking said conduit, a means for forcing fluid through said conduit into said steam generator, a motive fluid inlet through which a motive fluid is introduced into the cylinder, and a valve operated by fluid pressure in the generator and controlling the passage of fluid therefrom.

5. A device of the character described, including the combination with an internal combustion engine having a cylinder of a steam generator in said cylinder, a distributing chamber communicating with said generator, a fluid container, a fluid conduit leading from said container and communicating with said steam generator through said distributing chamber, a means for forcing fluid through said conduit into said distributing chamber and a valve controlling the passage of fluid from said distributing chamber to said steam generator.

6. A device of the character described including the combination with an internal combustion engine having cylinders of a steam generator in each cylinder, a distributing chamber communicating with each of said steam generators, valves intermittently blocking the passage of fluid from said distributing chamber to said steam generators, a fluid container, a fluid conduit leading therefrom and communicating with the distributing chamber means for forcing fluid through said conduit into the distributing chamber and a motive fluid inlet through which motive fluid is introduced into said cylinder.

7. A device of the character described including an internal combustion engine having cylinders in combination with a distributing chamber a steam generator in each of said cylinders, conduits leading from said distributing chamber to the respective generators, a means for controlling the flow of fluid through said conduits, a fluid container, a fluid conduit leading from said container and communicating with said distributing chamber, a pump in communication with said fluid conduit, and forcing the flow of fluid therethrough and into said distributing chamber, and a motive fluid inlet through which motive fluid is introduced into said cylinder.

8. A device of the character described, including the combination with an internal combustion engine having cylinders of a steam generator in each cylinder, a distributing chamber, conduits leading from said distributing chamber and communicating one with each of said generators, valves for intermittently blocking the flow of fluid through said conduits, a fluid container communicating with said distributing chamber, and a pump in communication with the fluid conduit and forcing the fluid therethrough.

9. In a device of the character described, a water tank, a distributing chamber, a fluid conduit connecting said tank and chamber, a pump for forcing water through said conduit from said tank to said chamber, a relief pipe communicating with said tank and conduit and means for blocking said pipe, all in combination with an internal combustion engine, a steam generator therein in communication with the chamber and means alternatively blocking and unblocking said communication.

10. A device of the character described including the combination with an internal combustion engine having a cylinder, of a fluid container, a fluid conduit leading therefrom, a steam generator in the cylinder with which said conduit communicates, means for forcing fluid through said conduit into said steam generator and a drain pipe leading from said generator, and means which alternatively opens and closes said drain pipe.

11. A device of the character described including the combination with an internal combustion engine having cylinders, of a steam generator in each cylinder, a distributing chamber communicating with each of said generators, means controlling the flow of fluid from said chamber to each of said generators, a fluid container having a surrounding jacket, a fluid conduit leading from said container and communicating with the distributing chamber, means for forcing fluid through said conduit into said chamber, an exhaust pipe communicating with each cylinder and also with said jacket and conducting the exhaust gases from the cylinders into said jacket for the purpose of heating the water in said container.

In testimony whereof I have signed my name to this specification in the presence of two subscribing witnesses.

WILLIAM W. HARWOOD.

Witnesses:
G. C. E. VAUGHAN,
S. H. VAUGHAN.

Copies of this patent may be obtained for five cents each, by addressing the "Commissioner of Patents, Washington, D. C."